United States Patent
Hsu (10) Patent No.: US 7,623,183 B2
(45) Date of Patent: Nov. 24, 2009

(54) FRAME RATE ADJUSTING METHOD AND APPARATUS FOR DISPLAYING VIDEO ON INTERLACE DISPLAY DEVICES

(75) Inventor: Rong-Fu Hsu, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 898 days.

(21) Appl. No.: 11/169,555

(22) Filed: Jun. 29, 2005

(65) Prior Publication Data

US 2007/0002167 A1    Jan. 4, 2007

(51) Int. Cl.
*H04N 7/01* (2006.01)
*H04N 11/00* (2006.01)

(52) U.S. Cl. ............... 348/443; 348/97; 348/459
(58) Field of Classification Search ........... 348/459, 348/441, 97, 443
See application file for complete search history.

(56) References Cited

U.S. PATENT DOCUMENTS

| 4,768,092 A | * | 8/1988 | Ishikawa | 348/458 |
| 5,517,248 A | * | 5/1996 | Isoda | 348/459 |
| 5,844,618 A | * | 12/1998 | Horiike et al. | 348/441 |
| 5,847,772 A | * | 12/1998 | Wells | 348/571 |
| 5,912,710 A | | 6/1999 | Fujimoto | |
| 6,055,018 A | * | 4/2000 | Swan | 348/448 |
| 6,236,806 B1 | * | 5/2001 | Kojima et al. | 386/131 |
| 6,442,201 B2 | * | 8/2002 | Choi | 375/240.12 |
| 6,658,056 B1 | * | 12/2003 | Duruoz et al. | 375/240 |
| 6,727,958 B1 | | 4/2004 | Shyu | |
| 2004/0236807 A1 | * | 11/2004 | Hsiung et al. | 708/200 |

* cited by examiner

*Primary Examiner*—Victor R Kostak
(74) *Attorney, Agent, or Firm*—Jianq Chyun IP Office (57) ABSTRACT

An apparatus for displaying a video image on a display system comprises a decoder for converting the video image into continuous fields arranged in a first sequence, the continuous fields having a first scan rate different from a second scan rate of the display system, and sending a first signal indicating the first scan rate, a system identifier for sending a second signal indicating the second scan rate, a controller in response to the first signal and the second signal for determining interrupt points for the continuous fields, the interrupt points dividing the continuous fields into odd-numbered sections of fields and even-numbered sections of fields, a buffer for storing the continuous fields, a reorganizing unit for reorganizing one of the odd-numbered or even-numbered sections of fields into reorganized sections of fields, and a multiplexing circuit for selecting the reorganized sections of fields from the reorganizing unit, and selecting the other of the odd-numbered or even-numbered sections of fields from the buffer to provide a second sequence having the second scan rate.

28 Claims, 11 Drawing Sheets

FIG. 5B

FRAME RATE ADJUSTING METHOD AND APPARATUS FOR DISPLAYING VIDEO ON INTERLACE DISPLAY DEVICES

BACKGROUND OF THE INVENTION

The present invention relates generally to a method and apparatus for digital video processing and, more particularly, to a method and apparatus for adjusting an original field sequence for display on a target display system having a vertical refresh rate inconsistent with the original field sequence.

A digital versatile disc ("DVD") video program is generally encoded in one of the following three frame formats having different resolutions and scan rates. The first frame format, having a resolution of 720×480 and a scan rate at 29.97 frames per second, is suitable for use in the National Television Standards Committee ("NTSC") color television system provided for North America and Japan. The second frame format, having a resolution of 720×480 and a scan rate at 23.976 frames per second, is generally used to encode film movies. The third frame format, having a resolution of 720×576 and a scan rate at 25 frames per second, is suitable for use in the Phase Alternating Line ("PAL") color television system provided for Europe and China. The first, second and third frame formats are collectively called as D1 format.

The NTSC and PAL scan formats have been widely used for commercial television systems. Both of the NTSC and PAL formats use interlaced scanning to reduce flicker. The NTSC scan format has a vertical refresh rate of 59.94 fields per second, whereas the PAL scan format has a vertical refresh rate of 50 fields per second. A vertical refresh rate refers to a rate at which one field of a frame is transmitted. In a display system such as a television system, a frame is created by scanning an electron beam horizontally across the screen from left to right, then moving back to the left, and scanning across the screen again. This process is repeated until all lines have been scanned, thus completing one frame of video. A complete frame interval includes an even field interval and an odd field interval following the even field interval, or vice versa. To properly display a DVD title or program on a television system, the DVD title must have an appropriate number of field lines, of which even field lines are displayed in an even field interval and odd field lines are displayed in an odd field interval. Each of the field lines includes an even or odd polarity.

It may sometimes be required to display a DVD title on a display system having a different format from that of the DVD title, for example, to display an NTSC-formatted title on a PAL television system, or vice versa. Due to the difference in vertical refresh rate between the NTSC and PAL systems, one is not able to properly display an NTSC-formatted DVD title on a PAL display system. Moreover, to display a DVD title on a display system of 625-lines/50 Hz (PAL) or 525-lines/59.94 Hz (NTSC) that have respectively 576 and 480 active lines in a frame time, it is necessary to modify the frame size to suit the interlaced display system. It is therefore desirable to have a method and apparatus for displaying a DVD title on a display system by providing enough resolution from a spatial point of view and maintain continuity of motion from a temporal point of view. Specifically, the DVD title should be processed to have appropriate field pictures and even/odd polarity so as to match the even/odd field time of an interlaced scanning sequence of a display system.

The present invention is directed to an apparatus and a method that obviate one or more problems resulting from the limitations and disadvantages of the prior art.

BRIEF SUMMARY OF THE INVENTION

In accordance with an embodiment of the present invention, there is provided an apparatus for displaying a video image on a display system that comprises a decoder for converting the video image into continuous fields arranged in a first sequence, the continuous fields having a first scan rate different from a second scan rate of the display system, and sending a first signal indicating the first scan rate, a system identifier for sending a second signal indicating the second scan rate, a controller in response to the first signal and the second signal for determining interrupt points for the continuous fields, the interrupt points dividing the continuous fields into odd-numbered sections of fields and even-numbered sections of fields, a buffer for storing the continuous fields, a reorganizing unit for reorganizing one of the odd-numbered or even-numbered sections of fields into reorganized sections of fields, and a multiplexing circuit for selecting the reorganized sections of fields from the reorganizing unit, and selecting the other of the odd-numbered or even-numbered sections of fields from the buffer to provide a second sequence having the second scan rate.

Also in accordance with the present invention, there is provided an apparatus for converting a first field sequence of a first field rate to a second field sequence of a second field rate that comprises a buffer for storing continuous fields of the first field sequence, a controller for determining interrupt points for the continuous fields in accordance with the first field rate and the second field rate, a reorganizing unit for reorganizing sections of the continuous fields corresponding to one of odd-numbered or even-numbered ones of the interrupt points into reorganized sections of fields, and a multiplexing circuit for selecting the reorganized sections of fields from the reorganizing unit, and selecting sections of the continuous fields from the buffer corresponding to the other of the odd-numbered or even-numbered ones of the interrupt points to provide the second field sequence.

Further in accordance with the present invention, there is provided a method for displaying a video image on a display system that comprises converting the video image into continuous fields arranged in a first sequence, sending a first signal indicating a first scan rate of the continuous fields, sending a second signal indicating a second scan rate of the display system different from the first scan rate, in response to the first signal and the second signal, determining interrupt points for the continuous fields, the interrupt points dividing the continuous fields into odd-numbered sections of fields and even-numbered sections of fields, reorganizing one of the odd-numbered or even-numbered sections of fields into reorganized sections of fields, and selecting the reorganized sections of fields having been reorganized, and the other of the odd-numbered or even-numbered sections of fields having not been reorganized to provide a second sequence having the second scan rate.

Still in accordance with the present invention, there is provided a method for converting a first field sequence of a first field rate to a second field sequence of a second field rate that comprises determining interrupt points for continuous fields of the first field sequence in accordance with the first field rate and the second field rate, reorganizing sections of the continuous fields corresponding to one of odd-numbered or even-numbered ones of the interrupt points into reorganized sections of fields, and selecting the reorganized sections of fields having been reorganized, and sections of the continuous fields corresponding to the other of the odd-numbered or even-numbered ones of the interrupt points having not been reorganized to provide the second field sequence.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the present invention and together with the description, serves to explain the principles of the invention.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1A:
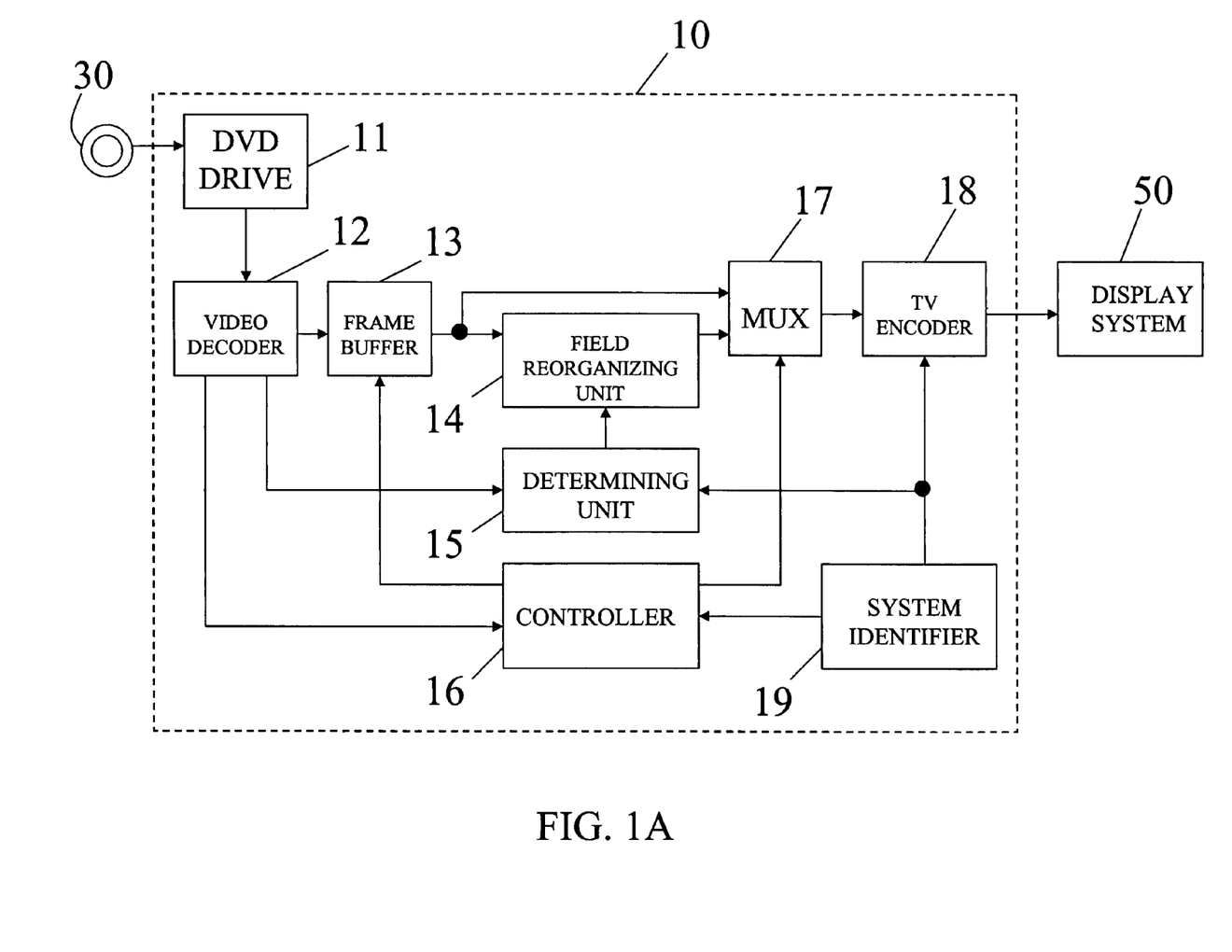
FIG. 1A is a schematic circuit block diagram of a video display apparatus in accordance with one embodiment of the present invention.

FIG. 1A is a schematic circuit block diagram of a video display apparatus 10 in accordance with one embodiment of the present invention. Referring to FIG. 1A, video display apparatus 10 includes a digital versatile disc ("DVD") drive 11, a video decoder 12, a frame buffer 13, a field reorganizing unit 14, a determining unit 15, a controller 16, a multiplexing circuit 17, a television ("TV") encoder 18, and a system identifier 19. In operation, DVD drive 11 reads the contents of a disc 30 and sends the contents to video decoder 12. Video decoder 12, connected to DVD drive 11, decodes the contents of disc 30 into decoded frames, and determines format information including, for example, the picture format and field scan rate, contained in the decoded frames. The decoded frames include continuous fields arranged in sequence. Specifically, the continuous fields include top and bottom field pictures interleaved with each other. Video decoder 12 on one hand sends the decoded frames to frame buffer 13, and on the other hand sends the format information to determining unit 15 and controller 16.

System identifier 19 determines the scan format of a display system 50, for example, a television monitor. The scan format, as previously described, includes one of the NTSC or PAL format. System identifier 19 generates a vertical synchronization signal $V_{SYNC}$ consistent with the vertical refresh rate of the scan format of display system 50, and a signal indicating the refresh rate. These signals are sent to determining unit 15, controller 16 and TV encoder 18.

Frame buffer 13 stores the continuous fields sent from video decoder 12. In response to the format information from video decoder 12 and the signal from system identifier 19, controller 16 determines interrupt points for the continuous fields, and sends a control signal regarding the interrupt points to frame buffer 13 and multiplexing circuit 17. Each of the interrupt points occurs at a period calculated by controller 16. If the scan rate of the decoded frames is greater than the refresh rate of display system 50, fields of the continuous fields stored in frame buffer 13 corresponding to the interrupt points are skipped. If the scan rate is smaller than the refresh rate, fields are inserted into the continuous fields at the interrupt points. The operation of controller 16 will be discussed in detail in the following paragraphs by reference to FIG. 1B.

Determining unit 15, in response to the format information from video decoder 12 and the signal from system identifier 19, provides a signal to field reorganizing unit 14 indicating how to reorganize the continuous fields sent from frame buffer 13. Field reorganizing unit 14, in response to the signal from determining unit 15, reorganizes the continuous fields to maintain consistency in the field sequence. Multiplexing circuit 17, in response to the control signal from controller 16, selects between the outputs of frame buffer 13 and field reorganizing unit 14. TV encoder 18 encodes and converts selected fields sent from multiplexing circuit 17 into an analog format that complies with video characteristics of display system 50. The operations of field reorganizing unit 14 and multiplexing circuit 17 will be discussed in detail in the following paragraphs.

Figure 1B:
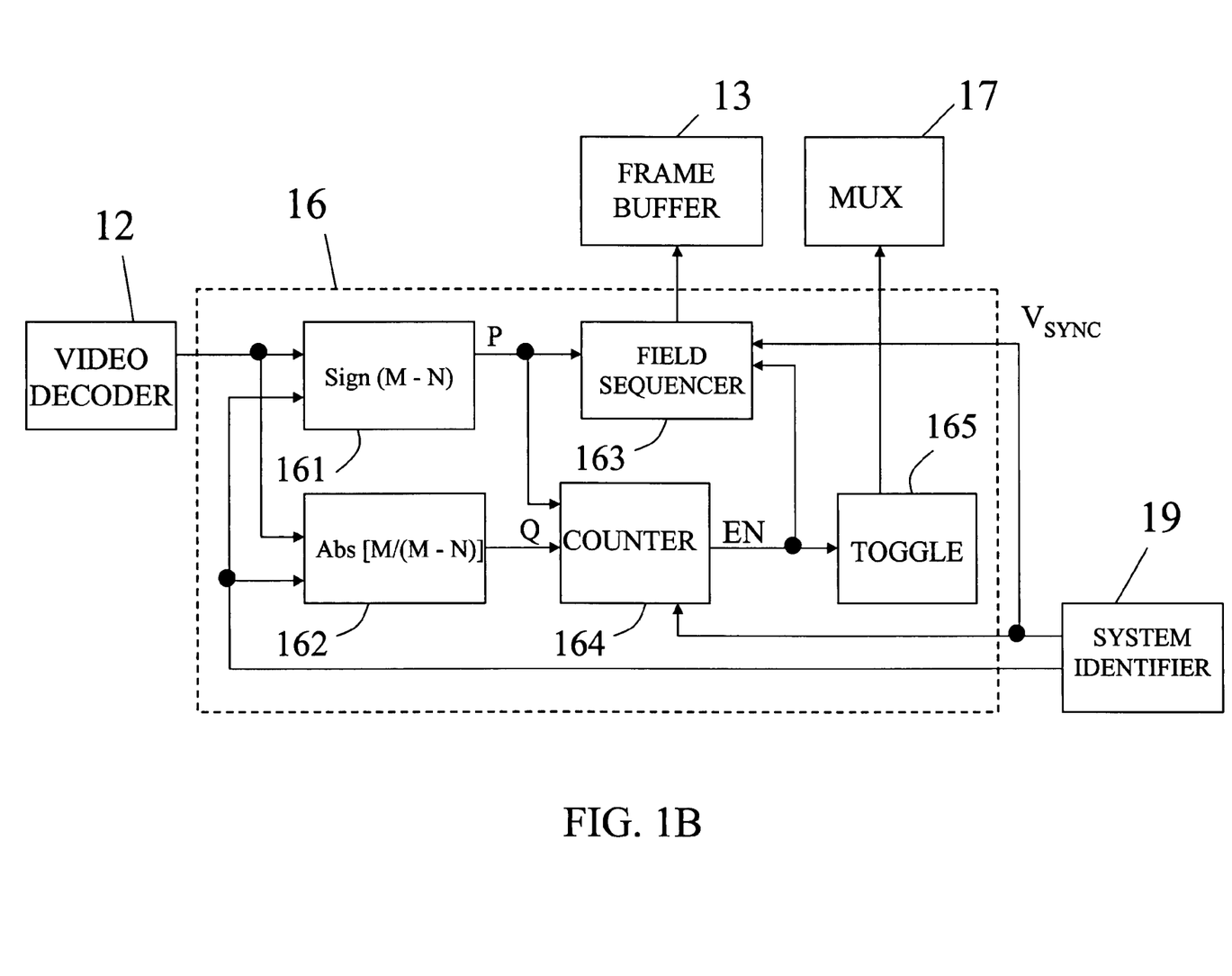
FIG. 1B is a schematic circuit block diagram of a controller of the video display apparatus shown in FIG. 1A.

FIG. 1B is a schematic circuit block diagram of controller 16 of video display apparatus 10 shown in FIG. 1A. Referring to FIG. 1B, controller 16 includes a first module 161, a second module 162, a field sequencer 163, a counter 164, and a toggle circuit 165. In response to a field scan rate M contained in the format information from video decoder 12 and a vertical refresh rate N indicated by the signal from system identifier 19, first module 161 calculates sign (M−N) to determine whether a skipping or inserting operation is taken in the continuous fields. The value of M includes one of 60 for an NTSC scan format, 50 for a PAL scan format, or 48 for a film scan format. The value of N includes either 60 or 50 for an NTSC or PAL scan format, respectively. If the sign (M−N) is positive, denoted by P=1, which means that the field scan rate M is greater than the vertical refresh rate N, a skipping operation is taken to periodically skip field pictures of the continuous fields stored in frame buffer 13. If the sign (M−N) is negative, denoted by P=0, which means that the field scan rate M is smaller than the vertical refresh rate N, an inserting operation is taken periodically to insert field pictures into the continuous fields. If M is equal to N, since the field scan rate is equal to the vertical refresh rate, neither skipping nor inserting operation is necessary. First module 161 sends a signal indicating the value of P to field sequencer 163 and counter 164.

Second module 162, in response to the scan rate M and refresh rate N, calculates an absolute value, Q=abs[M/(M−N)], to determine a period for generating the interrupt points. The value of Q includes one of 6, 5, 4 or 24, which will be further discussed by reference to FIGS. 2C, 3B, 4 and 5, respectively. Second module 162 sends a signal indicating the value of Q to counter 164. In response to the vertical refresh rate $V_{SYNC}$ sent from system identifier 19, counter 164 counts in a modulus-(Q−1) mode when P equals 1, and in a modulus-(Q+1) mode when P equals 0. Counter 164 sends an enable signal EN to field sequencer 163 and toggle circuit 165 in accordance with the modulus mode. Toggle circuit 165 sends a toggle signal to multiplexing circuit 17 in response to the enable signal EN. Field sequencer 163 skips an access to a field picture of the continuous fields stored in frame buffer 13 if P equals 1, and repeats an access to a field picture of the continuous fields if P equals 0.

Figure 2A:
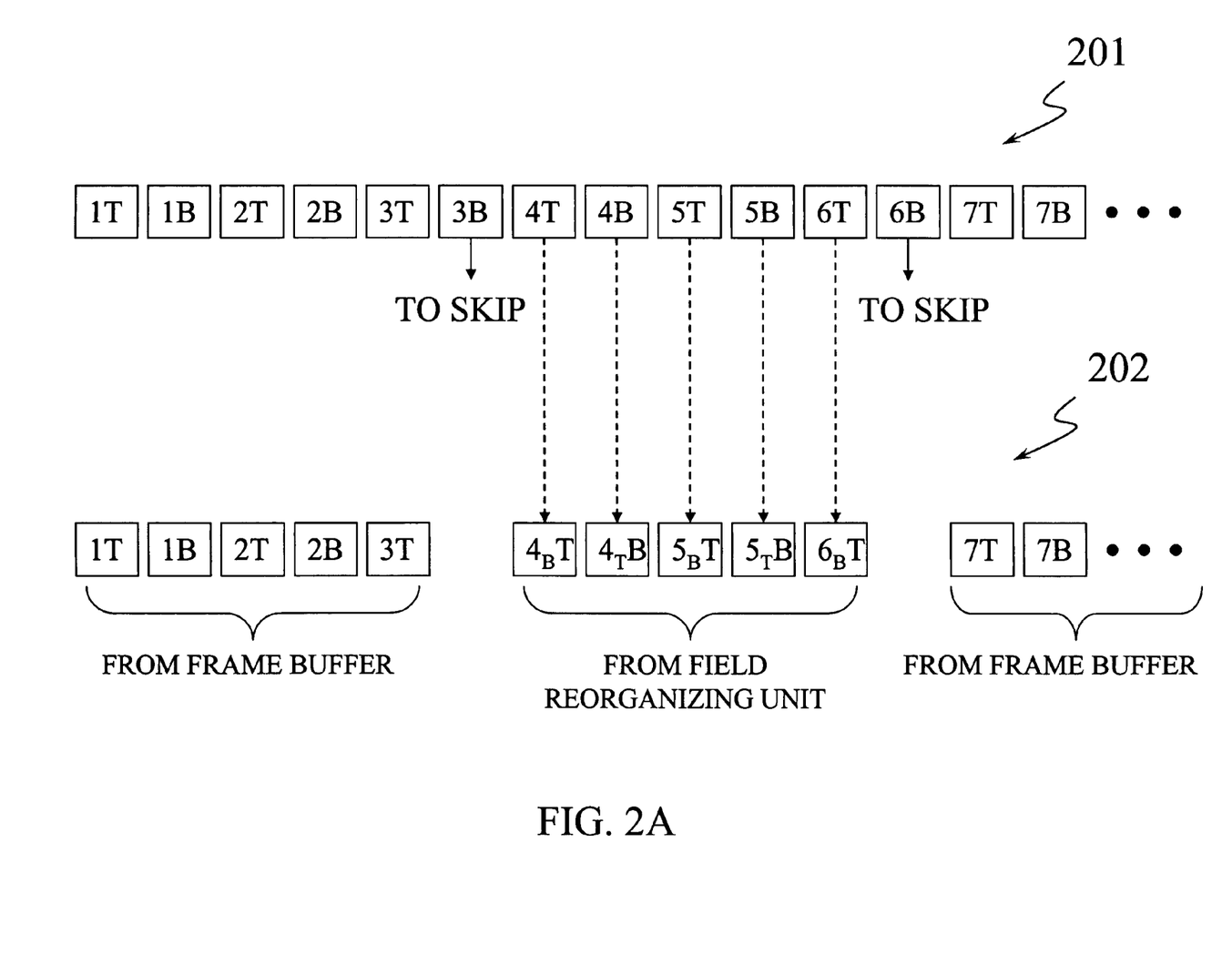
FIG. 2A is a schematic diagram illustrating an original field sequence of an NTSC-formatted title and a reorganized field sequence for display on a PAL display system in accordance with one embodiment of the present invention.

FIG. 2A is a schematic diagram illustrating an original field sequence 201 of an NTSC-formatted title and a reorganized field sequence 202 for display on a PAL display system in accordance with one embodiment of the present invention. Referring to FIG. 2A, original field sequence 201 stored in frame buffer 13 includes continuous fields in which top fields and bottom fields are interleaved with each other. Specifically, a first top field 1T of a first decoded frame sent from video decoder 12 is followed by a first bottom field 1B of the first decoded frame, a second top field 2T of a second decoded frame, which follows the bottom field 1B, is followed by a second bottom field 2B of the second decoded frame, and so on. In response to an interrupt point determined by controller 16, a field 3B corresponding to the interrupt point is skipped and subsequently will not displayed on display system 50. Fields 1T, 1B, 2T, 2B and 3T are selected by multiplexing circuit 17. Since the skipping destroys the field sequence, fields 4T, 4B, 5T, 5B and 6T are reorganized by field reorganizing unit 14 as fields $4_BT$, $4_TB$, $5_BT$, $5_TB$, and $6_BT$, where, for example, the field $4_BT$ represents a bottom field reorganized out of the top field 4T. Fields $4_BT$, $4_TB$, $5_BT$, $5_TB$, and $6_BT$ are then selected by multiplexing circuit 17. Next, in response to another interrupt point, a field 6B is skipped. The second skipping, however, recovers the sequence polarity, i.e., the top-bottom order, of the field sequence. Therefore, fields 7T, 7B, 8T, 8B and 9T are selected without reorganization. As a result, reorganized fields 202 provided by multiplexing circuit 17 include a first set of fields 1T, 1B, 2T, 2B and 3T selected from frame buffer 13, a second set of fields $4_BT$, $4_TB$, $5_BT$, $5_TB$, and $6_BT$ selected from field reorganizing unit 14, a third set of fields 7T, 7B, 8T, 8B and 9T selected from frame buffer 13, and so on. That is, multiplexing circuit 17 provides reorganized field sequence 202 including odd-numbered sets of fields selected from frame buffer 13 and even-numbered sets of fields selected from field reorganizing unit 14.

Figure 2B:
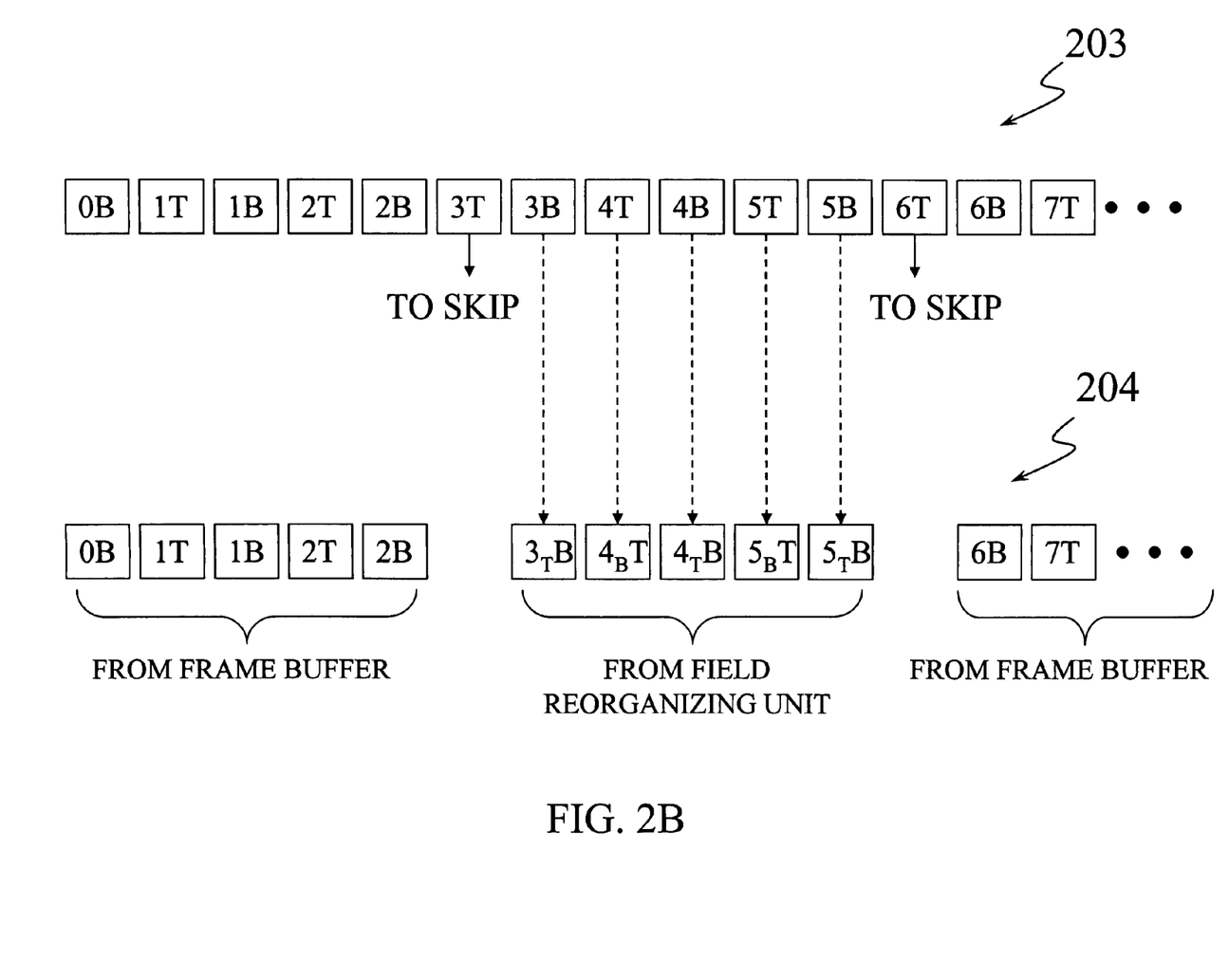
FIG. 2B is a schematic diagram illustrating an original field sequence of an NTSC-formatted title and a reorganized field sequence for display on a PAL display system in accordance with another embodiment of the present invention.

FIG. 2B is a schematic diagram illustrating an original field sequence 203 of an NTSC-formatted title and a reorganized field sequence 204 for display on a PAL display system in accordance with another embodiment of the present invention. Original field sequence 203 is similar to original field sequence 201 shown in FIG. 2A except that original field sequence 203 is led by a bottom field rather than a top field. Original field sequence 203 therefore has a sequence polarity different from that of original field sequence 201. Referring to FIG. 2B, fields 3T and 6T of original field sequence 203 will be skipped in response to interrupt points determined by controller 16. Reorganized field sequence 204 provided by multiplexing circuit 17 includes a first set of fields 0B, 1T, 1B, 2T and 2B selected from frame buffer 13, a second set of fields $3_TB$, $4_BT$, $4_TB$, $5_BT$ and $5_TB$ selected from field reorganizing unit 14, a third set of fields 6B, 7T, 7B, 8T and 8B selected from frame buffer 13, and so on. That is, multiplexing circuit 17 provides reorganized field sequence 204 including odd-numbered sets of fields selected from frame buffer 13 and even-numbered sets of fields selected from field reorganizing unit 14.

Figure 2C:
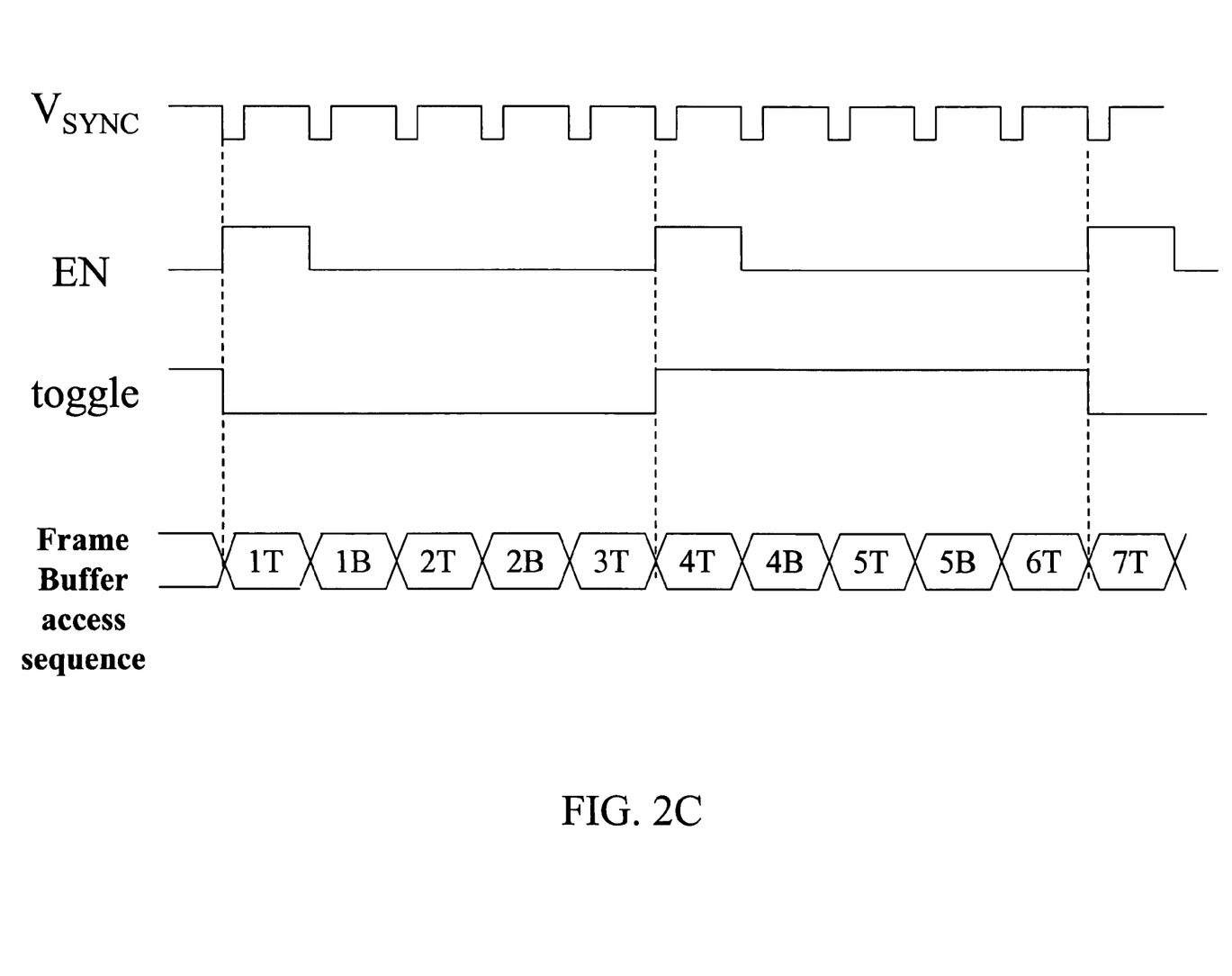
FIG. 2C is a schematic diagram illustrating a method for providing the reorganized field sequence shown in FIG. 2A in accordance with one embodiment of the present invention.

FIG. 2C is a schematic diagram illustrating a method for providing reorganized field sequence 202 shown in FIG. 2A in accordance with one embodiment of the present invention. In the present example, since an NTSC-format video is to be displayed on a PAL-format display system 50, the values of M, N, P and Q are respectively 60, 50, 1 (sign [60−50] being positive), and 6 (=abs[60/(60−50)]). Referring to FIG. 2C and FIG. 1B, counter 164 periodically counts $V_{SYNC}$ in modulus-5, i.e., turning over per 5 $V_{SYNC}$ cycles, and provides an enable signal EN having an active-high duration of one $V_{SYNC}$ cycle. The enable signal EN enables toggle circuit 165, which in turn provides a toggle signal to multiplexing circuit 17. The toggle signal is activated in response to an asserted enable signal and does not become inactivated until a next enable signal is asserted. When the toggle signal is in a logic low state, multiplexing circuit 17 selects the output of frame buffer 13. When the toggle signal is in a logic high state, multiplexing circuit 17 selects the output of field reorganizing unit 14.

Each field of original field sequence 201 has a field interval corresponding to one of the vertical refresh cycles $V_{SYNC}$. Field sequencer 163, in response to the enable signal EN and the value of P, skips an access to every sixth field of original field sequence 201. As a result, for every 60 continuous fields of an NTSC-format video, 10 fields thereof will be skipped and only 50 fields are provided for display so as to comply with a PAL-format display system. In the present example, the sixth field 3B, the twelfth field 6B and the like are skipped. Controller 16 therefore determines for original field sequence 201 an interrupt point, which occurs periodically in response to the enable signal EN. Fields 1T, 1B, 2T, 2B and 3T are selected from frame buffer 13 due to a logic low state of the toggle signal. Field 3B, which corresponds to an interrupt point at a rising edge of the enable signal, is skipped. Since the skipping destroys the sequence polarity, fields 4T, 4B, 5T, 5B and 6T of original field sequence 201 are reorganized as fields $4_BT$, $4_TB$, $5_BT$, $5_TB$, and $6_BT$ by field reorganizing unit 14 to maintain consistency in field sequence. Fields $4_BT$, $4_TB$, $5_BT$, $5_TB$, and $6_BT$ in field reorganizing unit 14 are selected due to a high logic state of the toggle signal.

Algorithms for reorganizing field sequence are predetermined by determining unit 15 shown in FIG. 1A. In one embodiment according to the invention, a top field of original field sequence is reorganized as a bottom field by performing bi-linearly interpolative filtering of adjacent scan lines of the top field, as given in a formula below.

$$BL_m = x(TL_m) + (1-x)TL_{m+1}$$

Where $BL_m$ represents an m-th scan line of the reorganized bottom field, x is a fractional number, $TL_m$ represents an m-th scan line of the top field, and $TL_{m+1}$ represents an (m+1)-th scan line of the top field.

Similarly, a bottom field of the original field sequence is reorganized as a top field by performing bi-linearly interpolative filtering of adjacent scan lines of the bottom field, as given in a formula below.

$$TL_m = y(BL_m) + (1-y)BL_{m-1}$$

Where $TL_m$ represents an m-th scan line of the reorganized top field, y is a fractional number, $BL_m$ represents an m-th scan line of the bottom field, and $BL_{m-1}$ represents an (m-1)-th scan line of the bottom field.

Referring again to FIG. 2C, next, field 6B is skipped in response to another interrupt point at another rising edge of the enable signal EN. The toggle signal returns to a logic low state in response to the enable signal. The skipping, however, recovers the sequence polarity and field reorganization is not necessary. Fields 7T, 7B, 8T, 8B and 9T are selected from frame buffer 13 due to a logic high state of the toggle signal. As a result, reorganized fields 202 includes a first set of fields 1T, 1B, 2T, 2B and 3T selected from frame buffer 13, a second set of fields $4_BT$, $4_TB$, $5_BT$, $5_TB$, and $6_BT$ selected from field reorganizing unit 14, a third set of fields 7T, 7B, 8T, 8B and 9T selected from frame buffer 13, and so on.

Figure 3A:
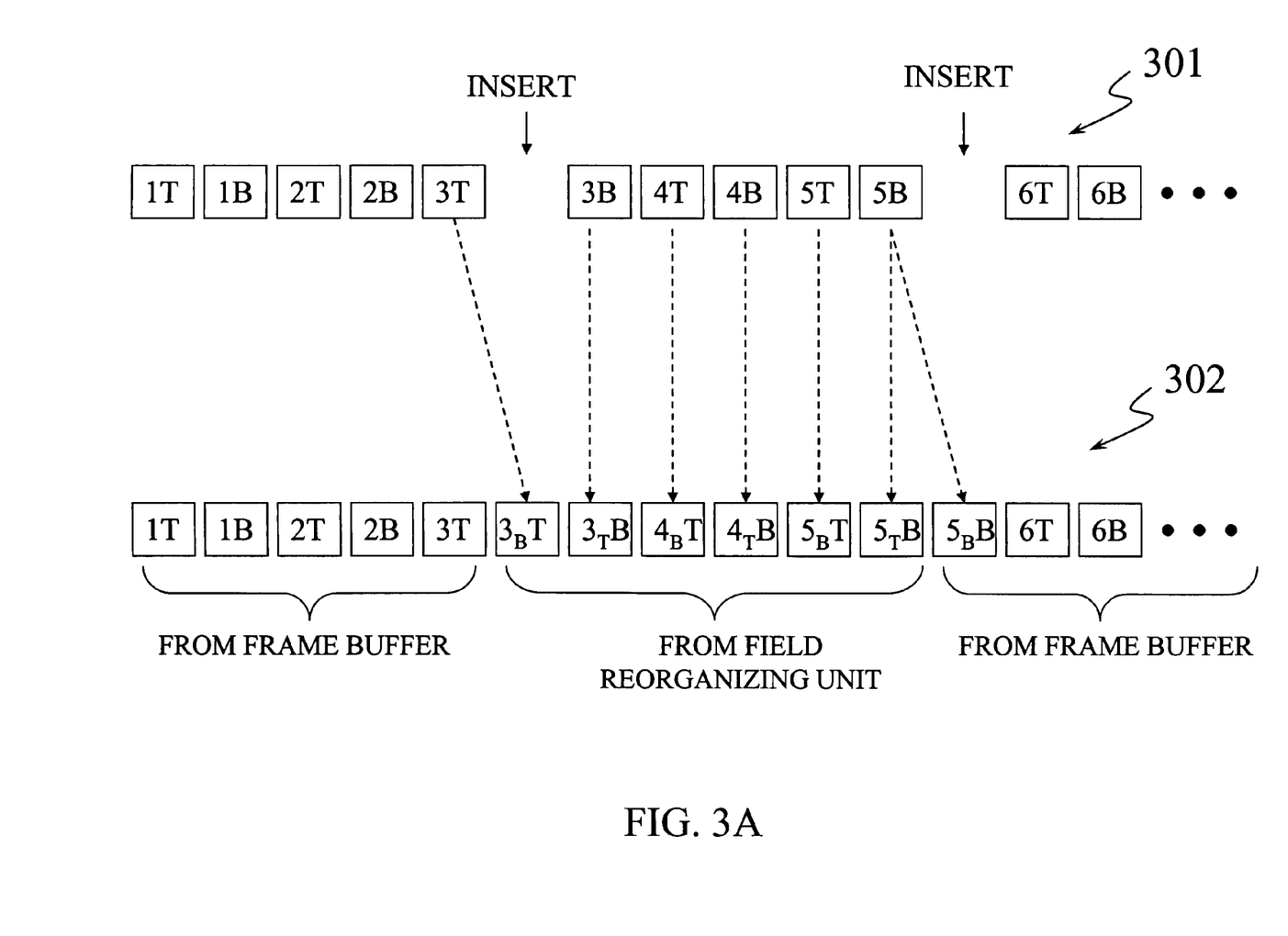
FIG. 3A is a schematic diagram illustrating an original field sequence of a PAL-formatted title and a reorganized field sequence for display on an NTSC display system in accordance with one embodiment of the present invention.

FIG. 3A is a schematic diagram illustrating an original field sequence 301 of a PAL-formatted title and a reorganized field sequence 302 for display on an NTSC display system in accordance with one embodiment of the present invention. Referring to FIG. 3A, in response to interrupt points determined by controller 16, fields $3_BT$ and $5_BB$ corresponding to the interrupt points are inserted into original field sequence 301. Field $3_BT$ represents a bottom field reorganized out of the field 3T, and field $5_BB$, a duplicate of the field 5B, represents a bottom field reorganized out of the field 5B. Fields 1T, 1B, 2T, 2B and 3T are selected by multiplexing circuit 17 from original field sequence 301. Since the insertion destroys the sequence polarity, fields 3B, 4T, 4B, 5T and 5B are reorganized by field reorganizing unit 14 as fields $3_TB$, $4_BT$, $4_TB$, $5_BT$ and $5_TB$. Fields $3_BT$, $3_TB$, $4_BT$, $4_TB$, $5_BT$, and $5_TB$ are then selected by multiplexing circuit 17 from field reorganizing unit 14. The insertion of field $5_BB$ recovers the field sequence. Therefore, fields 6T, 6B, 7T, 7B and 8T are selected from frame buffer 13 without reorganization. As a result, reorganized field sequence 302 provided by multiplexing circuit 17 include a first set of fields 1T, 1B, 2T, 2B and 3T selected from frame buffer 13, a second set of fields $3_BT$, $3_TB$, $4_BT$, $4_TB$, $5_BT$, and $5_TB$ selected from field reorganizing unit 14, a third set of fields $5_BB$, 6T, 6B, 7T, 7B and 8T selected from frame buffer 13, and so on. That is, multiplexing circuit 17 provides reorganized field sequence 302 including odd-numbered sets of fields selected from frame buffer 13 and even-numbered sets of fields selected from field reorganizing unit 14.

Figure 3B:
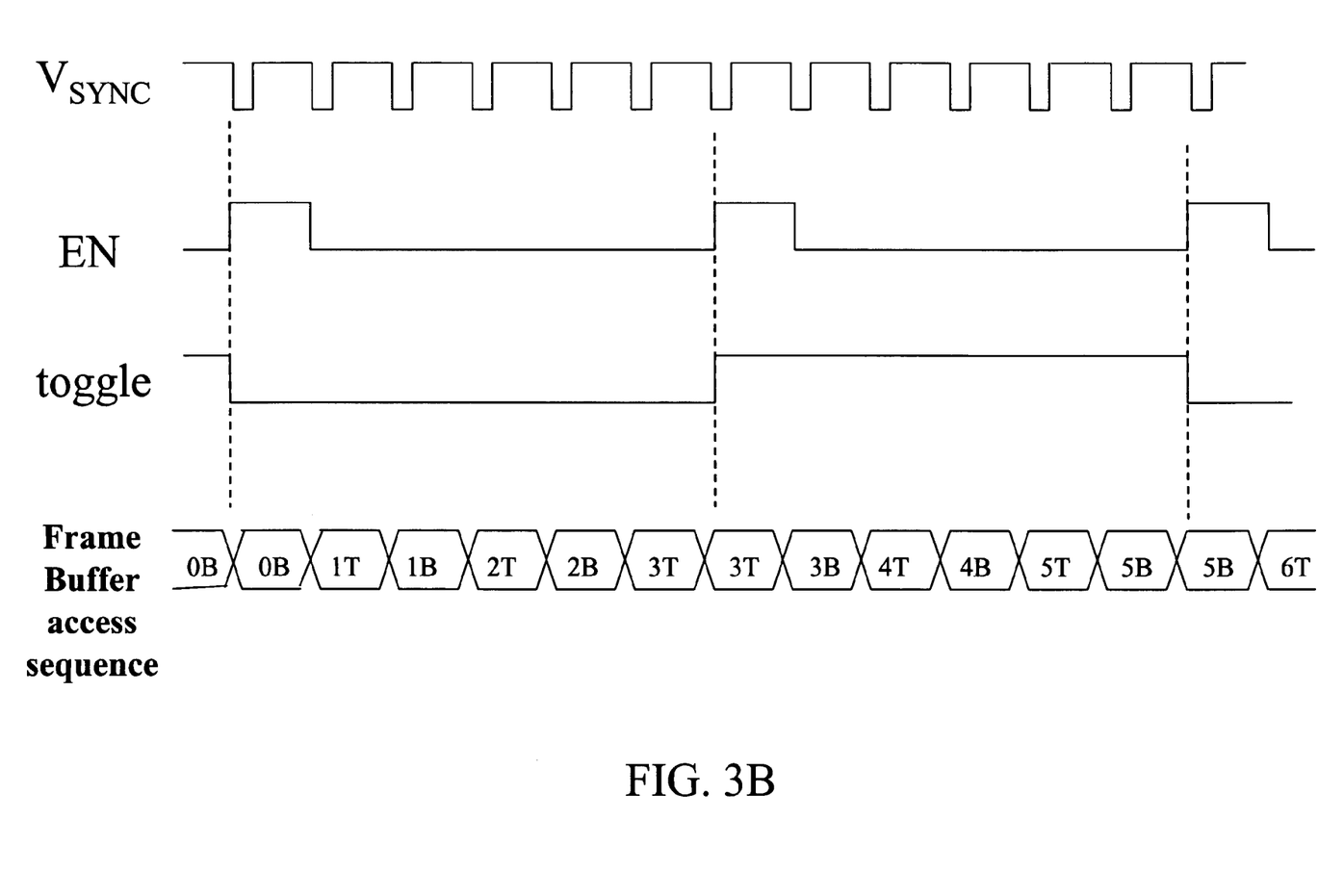
FIG. 3B is a schematic diagram illustrating a method for providing the reorganized field sequence shown in FIG. 3A in accordance with one embodiment of the present invention.

FIG. 3B is a schematic diagram illustrating a method for providing reorganized field sequence 302 shown in FIG. 3A in accordance with one embodiment of the present invention. In the present example, since a PAL-format video is to be displayed on an NTSC-format display system 50, the values of M, N, P and Q are respectively 50, 60, 0 (sign [50-60] being negative), and 5 (=abs[50/(50-60)]). Referring to FIG. 3B and FIG. 1B, counter 164 periodically counts $V_{SYNC}$ in mod-6, i.e., turning over per 6 $V_{SYNC}$ cycles, and provides an enable signal EN having an active-high duration of one $V_{SYNC}$ cycle. The enable signal EN enables toggle circuit 165, which in turn provides a toggle signal to multiplexing circuit 17. The toggle signal is activated in response to an asserted enable signal and does not become inactivated until a next enable signal is asserted. When the toggle signal is in a logic low state, multiplexing circuit 17 selects the output of frame buffer 13. When the toggle signal is in a logic high state, multiplexing circuit 17 selects the output of field reorganizing unit 14.

Field sequencer 163, in response to the enable signal EN and the value of P, repeats an access to every fifth field of original field sequence 301. As a result, for every 50 continuous fields of a PAL-format video, 10 fields will be inserted and a total number of 60 fields are provided for display so as to comply with an NTSC-format display system. In the present example, the fifth field 3T, the tenth field 5B and the like are repeatedly accessed. Controller 16 determines for original field sequence 301 an interrupt point, which occurs periodically in response to the enable signal EN. Fields 1T, 1B, 2T, 2B and 3T are selected from frame buffer 13 due to a logic low state of the toggle signal. New field $3_BT$ reorganized by field reorganizing unit 14 out of field 3T is inserted after field 3T. Since the insertion destroys the sequence polarity, fields 3B, 4T, 4B, 5T and 5B are reorganized by field reorganizing unit 14 as fields $3_TB$, $4_BT$, $4_TB$, $5_BT$ and $5_TB$, respectively. New field $5_BB$ duplicated from field 5B is inserted after field $5_TB$. Fields $3_BT$, $3_TB$, $4_BT$, $4_TB$, $5_BT$, and $5_TB$ are then selected by multiplexing circuit 17 from field reorganizing unit 14. Since the insertion of field $5_BB$ recovers the sequence polarity, fields 6T, 6B, 7T, 7B and 8T are selected from frame buffer 13 without reorganization.

Figure 4A:
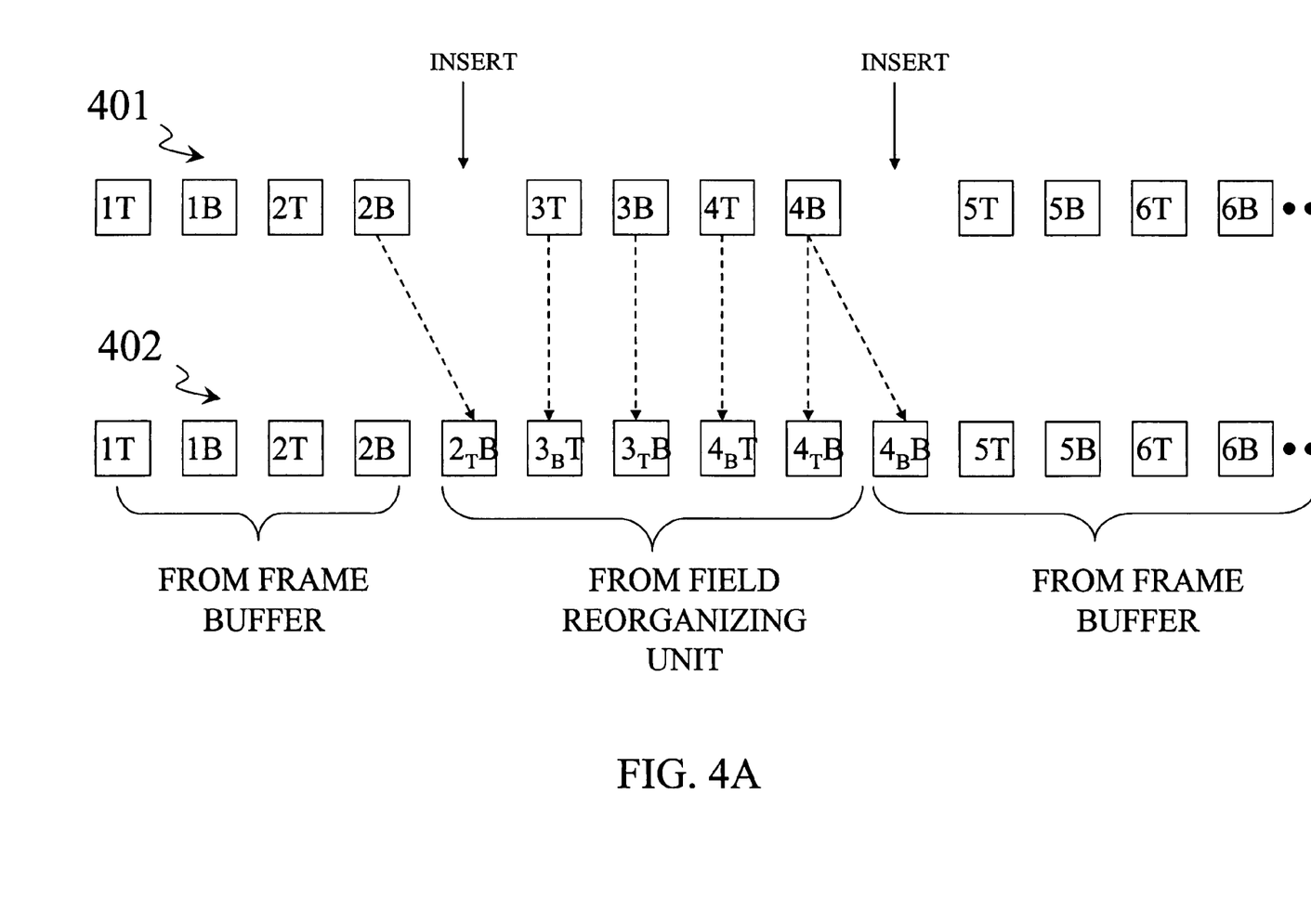
FIG. 4A is a schematic diagram illustrating an original field sequence of a film-formatted title and a reorganized field sequence for display on an NTSC display system in accordance with one embodiment of the present invention.

FIG. 4A is a schematic diagram illustrating an original field sequence 401 of a film-formatted title and a reorganized field sequence 402 for display on an NTSC display system in accordance with one embodiment of the present invention. Similar to the example shown in FIG. 3A, reorganized field sequence 402 shown in FIG. 4A includes, for example, inserted fields $2_TB$ and $4_BB$ reorganized out of fields 2B and 4B, respectively.

Figure 4B:
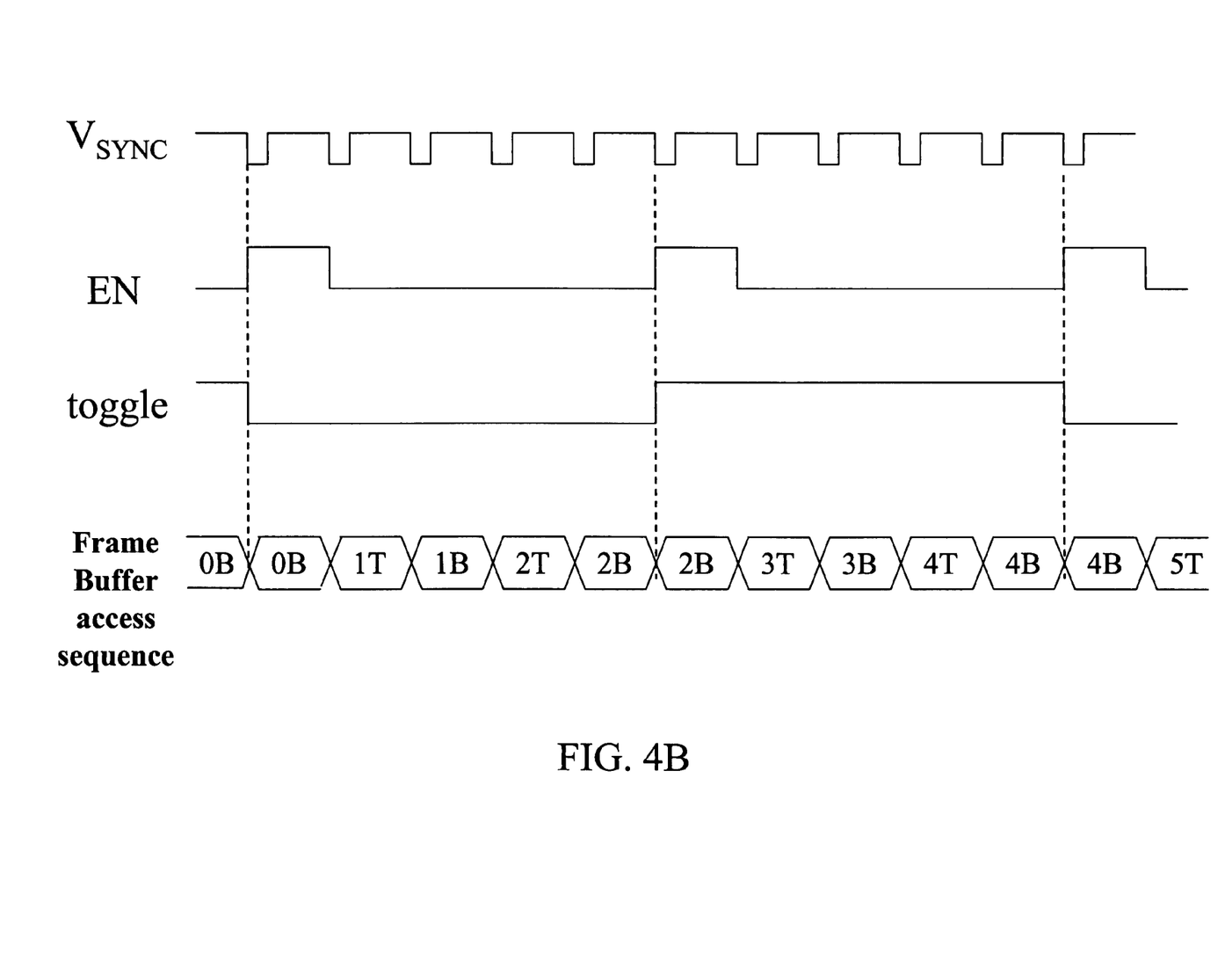
FIG. 4B is a schematic diagram illustrating a method for providing the reorganized field sequence shown in FIG. 4A in accordance with one embodiment of the present invention.

FIG. 4B is a schematic diagram illustrating a method for providing reorganized field sequence 402 shown in FIG. 4A in accordance with one embodiment of the present invention. In the present example, since a film-format video is to be displayed on an NTSC-format display system 50, the values of M, N, P and Q are respectively 48, 60, 0 (sign [48-60] being negative), and 4 (=abs[48/(48-60)]). Referring to FIG. 4A, FIG. 4B and FIG. 1B, counter 164 periodically counts $V_{SYNC}$ in modulus-5, i.e., turning over per 5 $V_{SYNC}$ cycles, and provides an enable signal EN having an active-high duration of one $V_{SYNC}$ cycle. The enable signal EN enables toggle circuit 165, which in turn provides a toggle signal to multiplexing circuit 17. The toggle signal is activated in response to an asserted enable signal and does not become inactivated until a next enable signal is asserted. When the toggle signal is in a logic low state, multiplexing circuit 17 selects the output of frame buffer 13. When the toggle signal is in a logic high state, multiplexing circuit 17 selects the output of field reorganizing unit 14.

Field sequencer 163, in response to the enable signal EN and the value of P, repeats an access to every fourth field of original field sequence 401. As a result, for every 48 continuous fields of a film-format video, 12 fields will be inserted and a total number of 60 fields are provided for display so as to comply with an NTSC-format display system. In the present example, the fourth field 2B, the eighth field 4B and the like are repeatedly accessed. Controller 16 determines for original field sequence 401 an interrupt point, which occurs periodically in response to the enable signal EN. Fields 1T, 1B, 2T and 2B are selected from frame buffer 13 due to a logic low state of the toggle signal. New field $2_TB$ reorganized by field reorganizing unit 14 out of field 2B is inserted after field 2B. Since the insertion destroys the sequence polarity, fields 3T, 3B, 4T and 4B are reorganized by field reorganizing unit 14 as fields $3_BT$, $3_TB$, $4_BT$ and $4_TB$, respectively. New field $4_BB$ duplicated from field 4B is inserted after field $4_TB$. Fields $2_TB$, $3_BT$, $3_TB$, $4_BT$, and $4_TB$ are then selected by multiplexing circuit 17 from field reorganizing unit 14. Since the insertion of field $4_BB$ recovers the sequence polarity, fields 5T, 5B, 6T and 6B are selected from frame buffer 13 without reorganization.

Figure 5A:
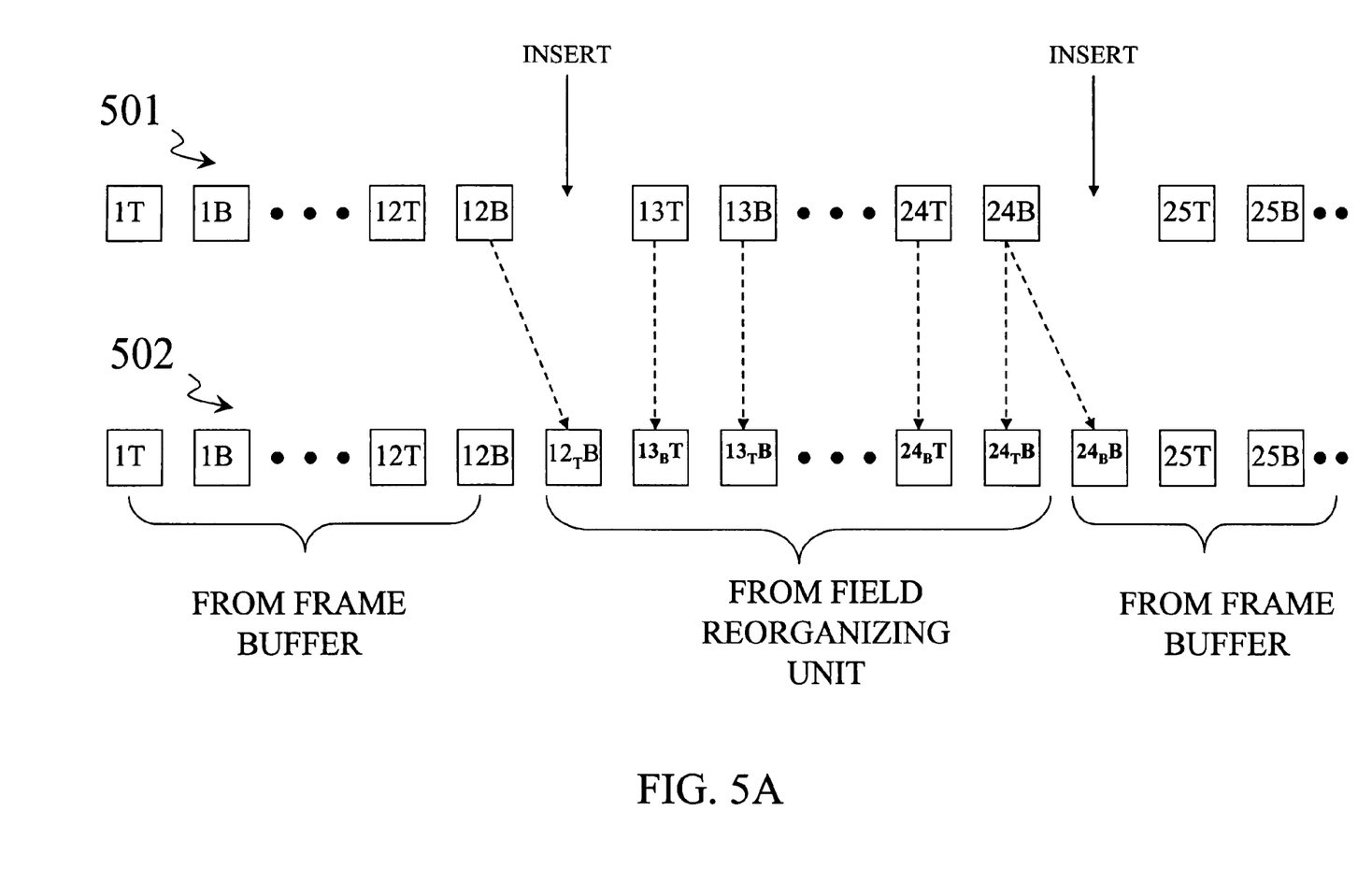
FIG. 5A is a schematic diagram illustrating an original field sequence of a film-formatted title and a reorganized field sequence for display on a PAL display system in accordance with one embodiment of the present invention.

FIG. 5A is a schematic diagram illustrating an original field sequence 501 of a film-formatted title and a reorganized field sequence 502 for display on a PAL display system in accordance with one embodiment of the present invention. Similar to the example shown in FIG. 3A, reorganized field sequence 502 shown in FIG. 5A includes, for example, inserted fields $12_TB$ and $24_BB$ reorganized out of fields 12B and 24B, respectively.

Figure 5B:
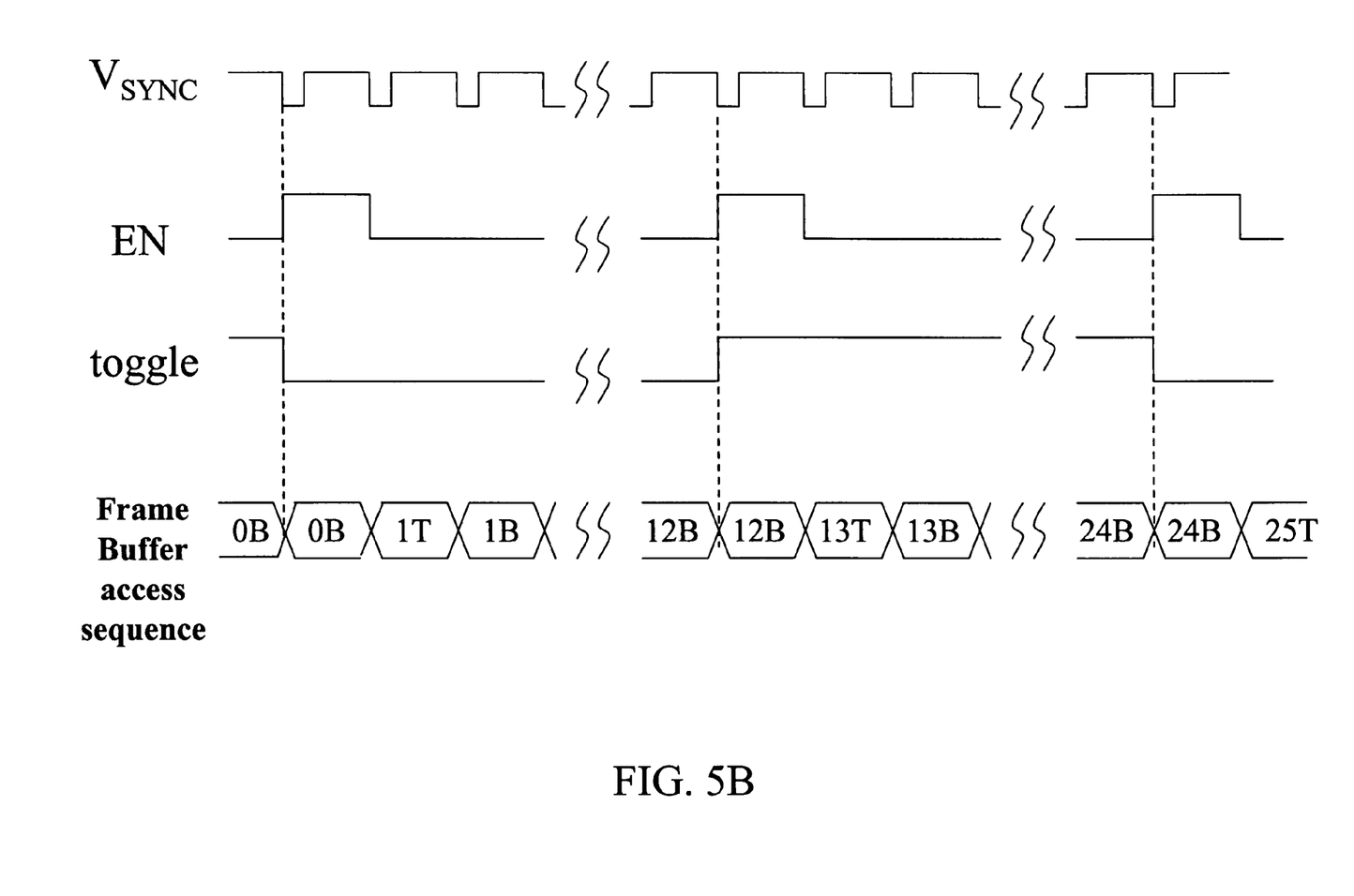
FIG. 5B is a schematic diagram illustrating a method for providing the reorganized field sequence shown in FIG. 5A in accordance with one embodiment of the present invention.

FIG. 5B is a schematic diagram illustrating a method for providing reorganized field sequence 502 shown in FIG. 5A in accordance with one embodiment of the present invention. In the present example, since a film-format video is to be displayed on a PAL-format display system 50, the values of M, N, P and Q are respectively 48, 50, 0 (sign [48−50] being negative), and 24 (=abs[48/(48−50)]). Referring to FIG. 5A, FIG. 5B and FIG. 1B, counter 164 periodically counts $V_{SYNC}$ in mod-25, i.e., turning over per 25 $V_{SYNC}$ cycles, and provides an enable signal EN having an active-high duration of one $V_{SYNC}$ cycle. The enable signal EN enables toggle circuit 165, which in turn provides a toggle signal to multiplexing circuit 17. The toggle signal is activated in response to an asserted enable signal and does not become inactivated until a next enable signal is asserted. When the toggle signal is in a logic low state, multiplexing circuit 17 selects the output of frame buffer 13. When the toggle signal is in a logic high state, multiplexing circuit 17 selects the output of field reorganizing unit 14.

Field sequencer 163, in response to the enable signal EN and the value of P, repeats an access to every twenty-fourth field of original field sequence 501. As a result, for every 48 continuous fields of a film-format video, 2 fields will be inserted and a total number of 50 fields are provided for display so as to comply with a PAL-format display system. In the present example, the twenty-fourth field 12B, the forty-eighth field 24B and the like are repeatedly accessed. Controller 16 determines for original field sequence 501 an interrupt point, which occurs periodically in response to the enable signal EN. Fields 1T, 1B, 2T, 2B to 12T and 12B are selected from frame buffer 13 due to a logic low state of the toggle signal. New field $12_TB$ reorganized by field reorganizing unit 14 out of field 12B is inserted after field 12B. Since the insertion destroys the sequence polarity, fields 13T, 13B, 14T, 14B to 24T and 24B are reorganized by field reorganizing unit 14 as fields $13_BT$, $13_TB$, $14_BT$, $14_TB$ to $24_BT$ and $24_TB$, respectively. New field $24_BB$ duplicated from field 24B is inserted after field $24_TB$. Fields $12_TB$, $13_BT$, $13_TB$, $14_BT$, $14_TB$ to $24_BT$, and $24_TB$ are then selected by multiplexing circuit 17 from field reorganizing unit 14. Since the insertion of field $24_BB$ recovers the sequence polarity, fields 25T, 25B, 26T, 26B to 36T and 36B are selected from frame buffer 13 without reorganization.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

I claim:

1. An apparatus for displaying a video image on a display system, comprising:
    a decoder for converting the video image into continuous fields arranged in a first sequence, the continuous fields having a first scan rate different from a second scan rate of the display system, and sending a first signal indicating the first scan rate;
    a system identifier for sending a second signal indicating the second scan rate;
    a controller in response to the first signal and the second signal for determining interrupt points for the continuous fields, the interrupt points dividing the continuous fields into odd-numbered sections of fields and even-numbered sections of fields;
    a buffer for storing the continuous fields;
    a reorganizing unit for reorganizing one of the odd-numbered or even-numbered sections of fields into reorganized sections of fields; and
    a multiplexing circuit for selecting the reorganized sections of fields from the reorganizing unit, and selecting the other of the odd-numbered or even-numbered sections of fields from the buffer to provide a second sequence having the second scan rate.

2. The apparatus of claim 1, wherein the continuous fields include top fields and bottom fields interleaved with the top fields.

3. The apparatus of claim 2, wherein the reorganizing unit reorganizes a top field of the continuous fields into a bottom field, or reorganizes a bottom field of the continuous fields into a top field.

4. The apparatus of claim 1, wherein a field of the continuous fields corresponding to one of the interrupt points is skipped if the first scan rate is greater than the second scan rate.

5. The apparatus of claim 4, wherein the controller includes a sequencing unit for skipping an access to the field of the continuous fields corresponding to the one of the interrupt points.

6. The apparatus of claim 1, wherein a field is inserted into the continuous fields at one of the interrupt points if the first scan rate is smaller than the second scan rate.

7. The apparatus of claim 6, wherein the controller includes a sequencing unit for repeating an access to a field of the continuous fields corresponding to the one of the interrupt points.

8. The apparatus of claim 1, wherein the controller includes:
a first module for determining whether fields are skipped from or inserted into the continuous fields;
a second module for determining the number of fields in the sections of the continuous fields; and
a counter for periodically generating the interrupt points.

9. An apparatus for converting a first field sequence of a first field rate to a second field sequence of a second field rate, comprising:
a buffer for storing continuous fields of the first field sequence;
a controller for determining interrupt points for the continuous fields in accordance with the first field rate and the second field rate;
a reorganizing unit for reorganizing sections of the continuous fields corresponding to one of odd-numbered or even-numbered ones of the interrupt points into reorganized sections of fields; and
a multiplexing circuit for selecting the reorganized sections of fields from the reorganizing unit, and selecting sections of the continuous fields from the buffer corresponding to the other of the odd-numbered or even-numbered ones of the interrupt points to provide the second field sequence.

10. The apparatus of claim 9, wherein the continuous fields include top fields and bottom fields interleaved with the top fields.

11. The apparatus of claim 10, wherein the reorganizing unit reorganizes a top field of the continuous fields into a bottom field, or reorganizes a bottom field of the continuous fields into a top field.

12. The apparatus of claim 9, wherein the controller includes a module for determining that a field corresponding to one of the interrupt points is to be skipped from the continuous fields of the first field sequence if the first field rate is greater than the second field rate.

13. The apparatus of claim 12, wherein the controller further includes a sequencing unit for skipping an access to the field of the continuous fields corresponding to the one of the interrupt points.

14. The apparatus of claim 9, wherein the controller includes a module for determining that a field is to be inserted into the continuous fields of the first field sequence at one of the interrupt points if the first field rate is smaller than the second field rate.

15. The apparatus of claim 14, wherein the controller further includes a sequencing unit for repeating an access to a field of the continuous fields corresponding to the one of the interrupt points.

16. The apparatus of claim 9, wherein the controller includes:
a first module for determining whether fields are skipped from or inserted into the continuous fields of the first field sequence;
a second module for determining the number of fields in the sections of the continuous fields corresponding to each of the interrupt points; and
a counter for periodically generating the interrupt points.

17. The apparatus of claim 9, further comprising a decoder for converting a video image into the continuous fields of the first field sequence.

18. A method for displaying a video image on a display system, comprising:
converting the video image into continuous fields arranged in a first sequence;
sending a first signal indicating a first scan rate of the continuous fields;
sending a second signal indicating a second scan rate of the display system different from the first scan rate;
in response to the first signal and the second signal, determining interrupt points for the continuous fields, the interrupt points dividing the continuous fields into odd-numbered sections of fields and even-numbered sections of fields;
reorganizing one of the odd-numbered or even-numbered sections of fields into reorganized sections of fields; and
selecting the reorganized sections of fields having been reorganized, and the other of the odd-numbered or even-numbered sections of fields having not been reorganized to provide a second sequence having the second scan rate.

19. The method of claim 18, further comprising skipping a field of the continuous fields corresponding to one of the interrupt points if the first scan rate is greater than the second scan rate.

20. The method of claim 18, further comprising inserting a field into the continuous fields at one of the interrupt points if the first scan rate is smaller than the second scan rate.

21. The method of claim 20, wherein the inserting step includes repeating an access to a field of the continuous fields corresponding to the one of the interrupt points.

22. A method for converting a first field sequence of a first field rate to a second field sequence of a second field rate, comprising:
determining interrupt points for continuous fields of the first field sequence in accordance with the first field rate and the second field rate;
reorganizing sections of the continuous fields corresponding to one of odd-numbered or even-numbered ones of the interrupt points into reorganized sections of fields; and
selecting the reorganized sections of fields having been reorganized, and sections of the continuous fields corresponding to the other of the odd-numbered or even-numbered ones of the interrupt points having not been reorganized to provide the second field sequence.

23. The method of claim 22, further comprising providing the continuous fields of the first field sequence with top fields and bottom fields interleaved with the top fields.

24. The method of claim 23, wherein the reorganizing step reorganizes a top field of the continuous fields into a bottom field, or reorganizes a bottom field of the continuous fields into a top field.

25. The method of claim 22, further comprising skipping a field of the first field sequence corresponding to one of the interrupt points if the first field rate is greater than the second field rate.

26. The method of claim 22, further comprising inserting a field into the first field sequence at one of the interrupt points if the first field rate is smaller than the second field rate.

27. The method of claim 26, wherein the inserting step includes repeating an access to a field of the first field sequence corresponding to the one of the interrupt points.

28. The method of claim 22, further comprising converting a video image into the continuous fields of the first field sequence.

* * * * *